UNITED STATES PATENT OFFICE.

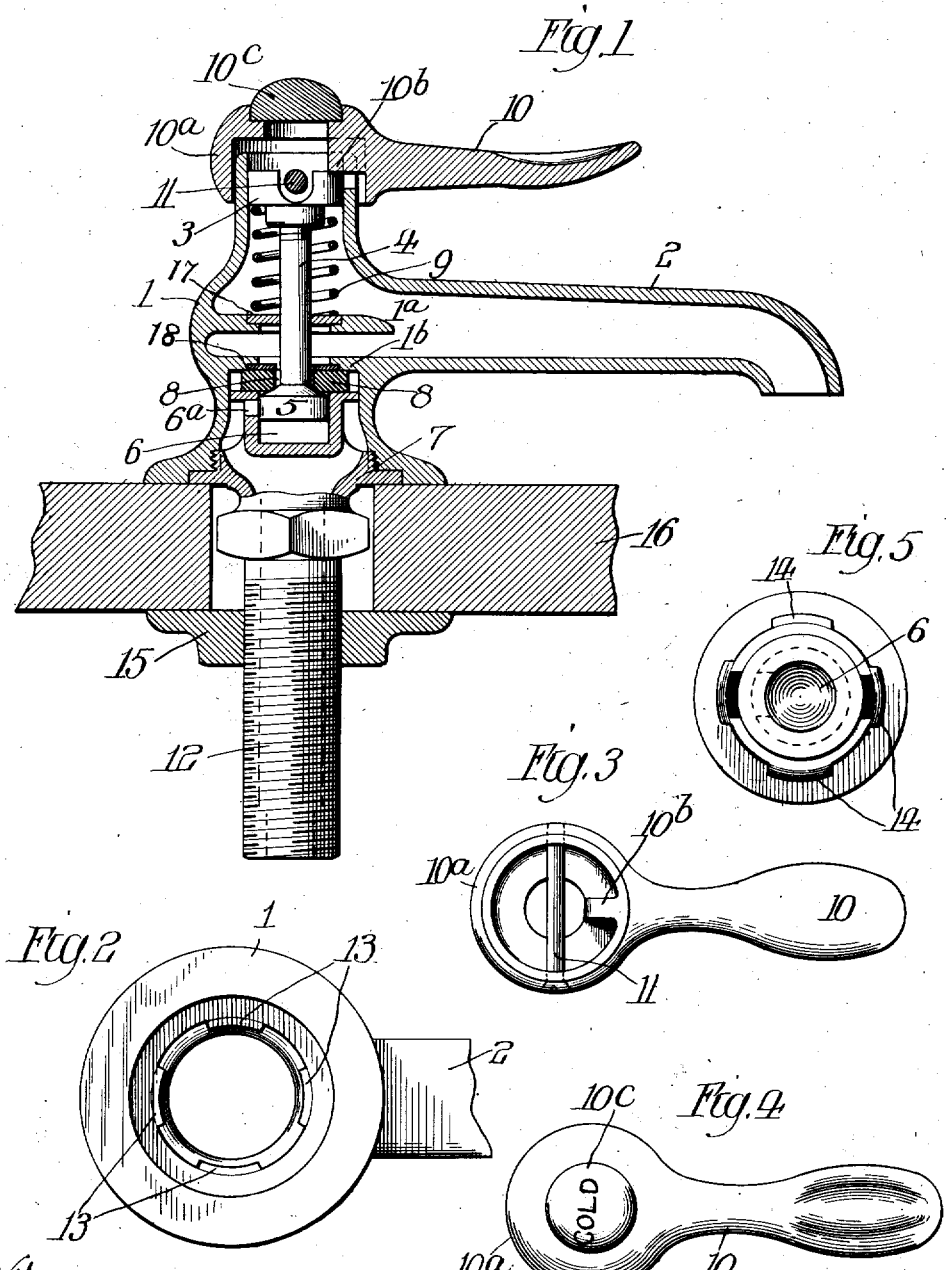

EARL G. WATROUS, OF CHICAGO, ILLINOIS.

BASIN-COCK.

1,018,463.   Specification of Letters Patent.   Patented Feb. 27, 1912.

Application filed May 21, 1907. Serial No. 374,841.

*To all whom it may concern:*

Be it known that I, EARL G. WATROUS, a citizen of the United States, residing at Chicago, Cook county, Illinois, have invented certain new and useful Improvements in Basin-Cocks, of which the following is a specification.

My invention relates to basin cocks and the like and the object thereof is to provide a simple and efficient device of this character.

The principal objects of my invention are, first, to provide a combined handle and cap piece for the casing or body of the cock and, second, to provide means whereby the casing or body of the basin cock may be readily removed from its pipe connection by limited angular movement, with the result that the spout or delivery portion of the basin cock may be made integral with the body instead of being made separate therefrom as in those basin cocks where the spout portion must be removed to permit the body of the basin cock to be rotated and thereby unscrewed from its pipe connection.

In the drawings, Figure 1 is a sectional elevation of my improved basin cock shown attached to a basin or the like; Fig. 2 is a bottom plan view of the casing or body portion of the cock; Fig. 3 a bottom plan view of the handle; Fig. 4 a top plan thereof; and Fig. 5 a plan view of the pipe connection.

The corresponding parts of the different figures are indicated by corresponding reference characters.

Referring to the present embodiment of my invention as illustrated in the drawing, the casing or body 1 of the basin cock is provided with the delivery or spout portion 2 which is formed integral with the casing or body portion. Within the upper cylindrical portion of the casing of the basin cock travels a piston 3 provided with a valve stem or rod 4 carrying at its lower end a valve 5 which is arranged to govern the passage of the water from the source of supply to and through the spout or delivery portion 2 of the basin cock. The valve 5, as shown is a piston movable in a dash-pot or chamber 6 formed, in the present instance, as an integral part of the shank or pipe connection 7 of the basin cock. This valve is adapted to close or seat upon a suitable seat 8, being spring pressed thereupon by the coiled spring 9, and is arranged to control a port $6^a$ in the dash-pot, and consequently the flow of water through the basin cock.

The valve 5 is under the control of a handle 10 which is adapted to be depressed as to its outer free end toward the delivery portion 2 of the cock and so constructed and arranged at its inner end as to not only constitute a handle, for operating the valve but also as a cap for closing the upper end of the casing or body of the cock. As shown the inner end of the handle has a somewhat ball shaped portion $10^a$ which is hollow and adapted to fit over such open end of the casing. This handle is pivoted to the casing upon the pin 11 which extends through the side walls of the ball portion of the handle and also through opposite sides of the upper or cylindrical portion of the casing 1, the piston 3 in the present instance being diametrically slotted to accommodate such pin. For the purpose of operating the valve mechanism the ball portion of the handle is provided on its interior with an inwardly directed and substantially radial lug $10^b$, as shown in Figs. 1 and 3 and the latter is arranged to bear upon the upper surface of the piston 3 and to force the same downwardly when the handle is depressed in the manner already explained. As a result the valve 5 is opened and the water admitted. It will be understood that the opening in the ball portion of the handle is sufficiently large to permit the described operation of the handle. It is therefore evident that the handle has a two-fold function, inasmuch as it serves as a handle for operating the valve mechanism and also as a cap for the casing or body of the basin cock inasmuch as it extends over and covers the open end of the same. If desired the handle may be provided with a button $10^c$ inset or secured therein and suitably inscribed to indicate whether it is the hot or cold water faucet or cock.

As shown in Figs. 1 and 2, the lower portion of the casing or body of the basin cock is provided with a mutilated or broken thread, there being in the present instance four sections 13 of such thread spaced apart equal distances and with equal intervening blank spaces. The shank pipe connection 7 is provided with a correspondingly mutilated or broken thread, there being a similar number of threaded sections 14 as shown in Fig. 5. In practice the body of the basin cock is applied to the pipe connection 7 with the threaded sections of one entering the blank intervening spaces of the other, whereupon the casing or body is given a one-eighth rotation whereupon the threaded sections of both the casing and pipe connection are caused to engage and the parts thereby held securely together. In practice the parts described are assembled as illustrated in Fig. 1, after which a clamping nut 15 screwing upon the shank or pipe connection 12 serves to clamp the parts to the basin structure indicated at 16.

When the above described mode of connection between the pipe 7 and the body 1 is adopted the delivery portion or spout 2 of the basin cock may be made integral with the body portion inasmuch as this form of connection between the parts does not necessitate the entire rotation of the casing or body, so that it is not necessary to remove the spout 2. It will be understood that when the parts are clamped to the structure of the basin or the like the casing or body of the basin cock is held against rotation so that it cannot be removed from the pipe connection, but when the clamping nut 15 is loosened such casing may be readily removed by simply turning it one-eighth in the proper direction.

I prefer to form the dash-pot integral with the shank or pipe connection 7 inasmuch as the act of removing such part from the body of the cock or vice versa at once gives access to the operating parts within and permits of their ready inspection or removal. Moreover such construction provides a means for clamping the elastic seat 8 in place and for also causing the latter to act as a seal to prevent water from escaping around it. To this end the top face of the dash-pot is arranged to press against such seat and hold it tightly in place.

In practice and by preference, instead of coring and afterward finishing small sized openings in the deflector 1ª and wall 1ᵇ for the valve rod or stem 4 to pass through, I core large openings therein and provide them with disks 17 and 18, respectively, of brass or other metal and having central openings. The opening in the disk 17 is of a size to accommodate the valve stem 4 and permit its free movement and the opening in the other disk is of a size to permit the proper amount of flow of water around the valve stem when the valve is opened. As shown in Fig. 1 the seat 8 fits both against the wall 1ᵇ and the disk 18 and thereby seals the joint between such disk and wall.

I claim:

1. In a basin-cock, the combination, with a casing or body having a tubular upper end, a base flange and a forwardly projecting spout, of a valve controlling the water passage leading through the bottom of the valve casing to the spout, and a combined handle and cap-piece comprising a cup shaped portion fitting over and surrounding and inclosing the tubular upper end of the valve casing and pivoted thereto, and a forwardly projecting handle portion, and means intermediate said combined cap-piece and handle and the valve for causing the depression of the handle to open the valve and permit the passage of water through the valve body to the spout, substantially as described.

2. In a basin-cock, the combination, with a casing or body having a tubular upper portion, a base flange and a forwardly projecting spout, formed integral with each other and provided with a waterway leading through the bottom of the casing to the spout, of a valve controlling said waterway, a piston fitting within the tubular upper end of the valve casing and a valve stem depending from said piston and carrying the valve, a coiled spring surrounding the valve stem and exerting an upward pressure upon said piston, and a combined cap-piece and handle comprising a cup shaped portion fitting over and surrounding and inclosing the tubular upper end of the valve casing and pivoted thereto, and adapted when rocked upon its pivot to depress the piston and valve and open the latter, and a forwardly projecting handle portion for operating said parts, substantially as described.

3. In a basin-cock, the combination, with a casing or body having a tubular upper end, a base flange and a forwardly projecting spout, with a waterway leading through the bottom of the casing to the spout, of a piston fitting within the tubular upper end of the casing, a valve stem depending therefrom, a valve carried by said stem and controlling the waterway, a horizontal deflector located within the casing above the valve and having the valve stem passing through it, a coiled spring surrounding the valve stem between the deflector and piston and exerting an upward pressure upon the latter and the valve, and a combined cap-piece and handle comprising a cup shaped portion surrounding and inclosing the tubular upper end of the valve casing and pivoted thereto, and a forwardly projecting handle portion, said cap-piece and handle coöperating with the piston and valve to open the latter when the handle is depressed, substantially as described.

4. In a basin cock and the like, the combination, with the casing or body of the cock, of a valve therein for controlling the supply of water, a piston arranged within the casing and connected with the valve, a combined handle and cap consisting of a forwardly projecting handle portion and an inner cup-shaped portion fitting over and completely encircling the upper portion of the casing and pivoted thereto, said cup-shaped portion having an inwardly directed lug arranged to depress the piston to open the valve when the handle is operated substantially as described.

5. In a basin cock, the combination, with the casing or body 1 having the tubular upper end provided with a notch or recess in its forward side, a base flange, a forwardly projecting spout 2, an internal horizontal deflector plate 1ª, all formed integral with each other, of the piston 3 fitting within the tubular end of the casing, the valve stem 4 depending from said piston, the valve 5 carried by said stem and controlling the waterway leading through the bottom of the casing to the spout 2, the coiled spring 9 surrounding the stem 4 between the piston 3 and deflector plate 1ª, and the combined cap-piece and handle comprising the cup shaped portion 10ª surrounding and inclosing the tubular upper end of the valve casing 1 and pivoted thereto by the pivot 11 and having the inwardly projecting lug 10ᵇ passing through the notch or recess in the tubular upper end of the casing and coöperating with the piston 3, and the forwardly projecting handle 10, substantially as described.

6. In a basin cock, the combination of a casing provided with a mutilated thread, a piston valve therein, a pipe connection having a dash pot chamber which is integral therewith and in which said valve operates, and a valve seat clamped between the dash pot chamber and a part of the casing, said pipe connection having a mutilated thread whereby said valve seat is adapted to be clamped between said casing and said dash pot chamber, and the casing adapted to be removed from the connection by a limited angular movement.

7. In a basin cock, the combination of a casing having a bearing surface at its base adapted to rest upon the surface of the basin structure, a piston valve therein, a pipe connection having a dash pot chamber which is integral therewith and in which said valve operates, a valve seat between the dash pot chamber and a part of the casing, said casing and pipe connection having a mutilated thread connection whereby the valve seat is adapted to be clamped in place and said parts are adapted to be engaged and disengaged by a slight angular movement, and a clamping nut for clamping the casing rigidly to the basin structure.

8. In a basin cock, the combination of a casing, a piston valve therein, a pipe connection having a dash-pot chamber which is integral therewith and in which said valve operates, and a valve seat 8 clamped between the dash-pot chamber and a part of the casing; substantially as described.

9. In a basin cock, the combination of a casing having its lower end provided with a mutilated thread and having a bearing surface at its base adapted to rest upon the surface of the basin structure, a piston valve in said casing, and a pipe connection having a similarly mutilated thread and adapted to be connected to the casing and removed therefrom by a limited angular movement, said pipe connection having formed integral with it a dash-pot chamber for said valve, and a clamping nut for clamping the casing rigidly to the basin structure; substantially as described.

10. In a basin cock, the combination of a casing 1 having the deflector 1ª and wall 1ᵇ provided with openings, disks 17 and 18 arranged in said openings respectively and provided with central openings, a valve seat 8 arranged against said wall 1ᵇ and the disk 18, a valve 5 coöperating with said seat and having a valve stem 4 passing through said openings in the disks, and means for operating said valve stem; substantially as described.

EARL G. WATROUS.

Witnesses:
S. E. HIBBEN,
LOUIS B. ERWIN.

---

Copies of this patent may be obtained for five cents each, by addressing the "Commissioner of Patents, Washington, D. C."